(12) United States Patent
Nie et al.

(10) Patent No.: US 12,450,560 B2
(45) Date of Patent: Oct. 21, 2025

(54) UNSTACKING OPTIMIZATION

(71) Applicant: Walmart Apollo, LLC, Bentonville, AR (US)

(72) Inventors: Tiantian Nie, Fremont, CA (US); Xiaojie Wang, Redmond, WA (US); Ti Zhang, Rocklin, CA (US); Jing Huang, San Jose, CA (US); Mingang Fu, Palo Alto, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 355 days.

(21) Appl. No.: 18/103,077

(22) Filed: Jan. 30, 2023

(65) Prior Publication Data

US 2024/0257044 A1    Aug. 1, 2024

(51) Int. Cl.
*G06Q 10/087* (2023.01)

(52) U.S. Cl.
CPC .................. *G06Q 10/087* (2013.01)

(58) Field of Classification Search
CPC .................................................. G06Q 10/087
USPC .......................................................... 705/28
See application file for complete search history.

(56) References Cited

U.S. PATENT DOCUMENTS

| | | | | |
|---|---|---|---|---|
| 8,321,258 B2* | 11/2012 | Gottlieb | ................. | G06Q 10/08 340/568.1 |
| 11,550,968 B2* | 1/2023 | Huang | .................... | G06F 30/17 |
| 11,829,688 B2* | 11/2023 | Liu | ........................ | G06F 30/15 |
| 11,960,800 B2* | 4/2024 | Sun | ........................ | G06F 30/17 |
| 2008/0077464 A1* | 3/2008 | Gottlieb | ................. | G06Q 10/08 705/28 |
| 2021/0150475 A1 | 5/2021 | Huang et al. | | |
| 2023/0019662 A1* | 1/2023 | van't Westeinde | .. | G01C 21/343 |
| 2024/0245233 A1* | 7/2024 | Whitta | ............... | B65D 19/0004 |

FOREIGN PATENT DOCUMENTS

| | | | | |
|---|---|---|---|---|
| CN | 211768039 U | | 10/2020 | |
| WO | WO-2023282997 A1 | * | 1/2023 | ......... G01C 21/3415 |

OTHER PUBLICATIONS

Alonso, M., et al., "Algorithms for Pallet Building and Truck Loading in an Interdepot Transportation Problem," Mathematical Problems in Engineering Mar. 15, 2016.
Kavakeb, S., "Evolutionary Algorithms and Simulation for Intelligent Autonomous Vehicles in Container Terminals," Thesis submitted to Liverpool John Moores University Mar. 2015.

* cited by examiner

*Primary Examiner* — Russell S Glass
(74) *Attorney, Agent, or Firm* — FOLEY & LARDNER LLP

(57) ABSTRACT

A system including one or more processors and one or more non-transitory computer-readable media storing computing instructions, that when executed on the one or more processors, cause the one or more processors, to perform: obtaining a first load plan, wherein the first load plan comprises a set of stacks assigned to floor spots of a trailer; determining that at least one of (a) there is an empty floor spot in the first load plan for the trailer or (b) the first load plan is infeasible; determining a target number of stacks for an updated load plan; iterating, via simulated annealing, through modifications to the updated load plan; terminating the iterating when a predetermined termination criteria is satisfied; and outputting the updated load plan. Other embodiments are disclosed.

20 Claims, 10 Drawing Sheets

UNSTACKING OPTIMIZATION

TECHNICAL FIELD

This disclosure relates generally to unstacking optimization.

BACKGROUND

A loading plan for a trailer generated by a load planner system provides a plan for loading a number of pallets and stacks on a trailer, so they can be transported to designated locations via a route plan by a promised date. When some pallets are not able to be loaded as part of the loading plan, those pallets become unplanned pallets. The problem with unplanned pallets can be complex and inefficiently addressed by manual means.

BRIEF DESCRIPTION OF THE DRAWINGS

To facilitate further description of the embodiments, the following drawings are provided in which.

Figure 1:
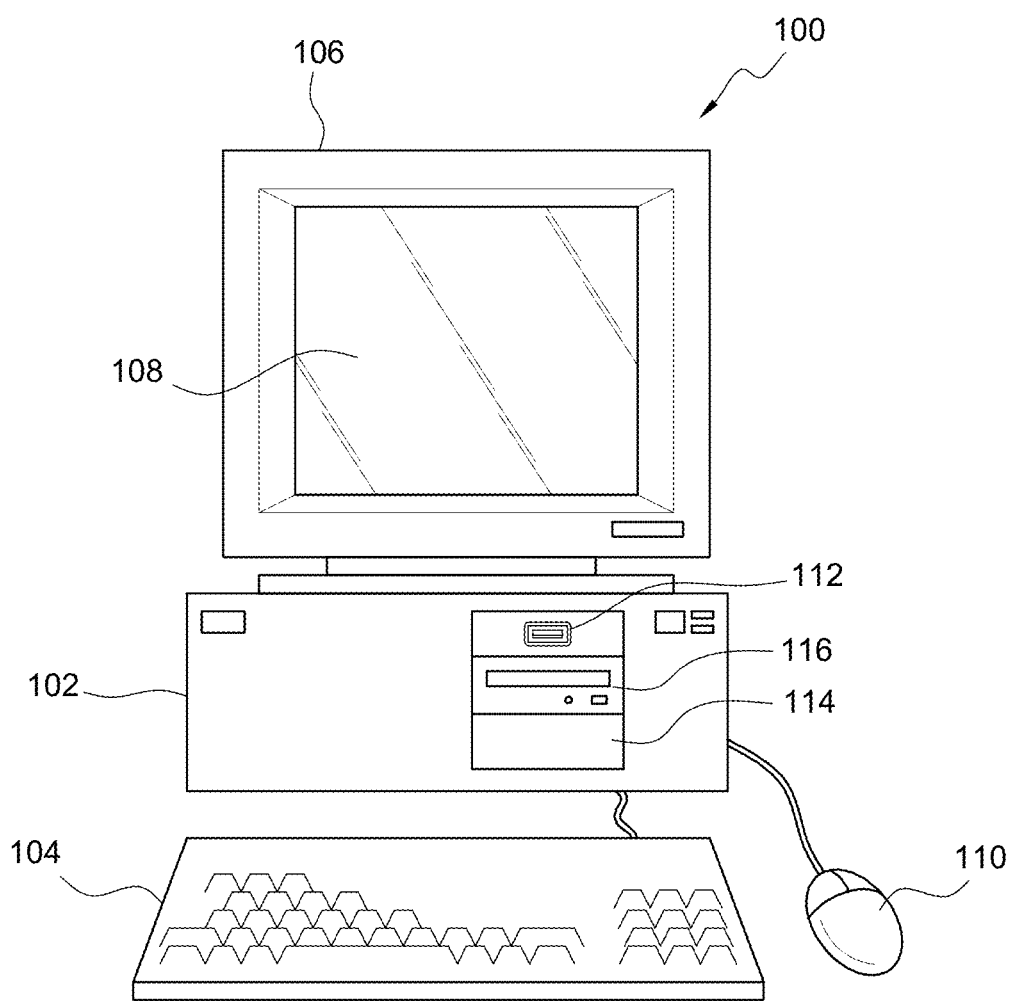
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
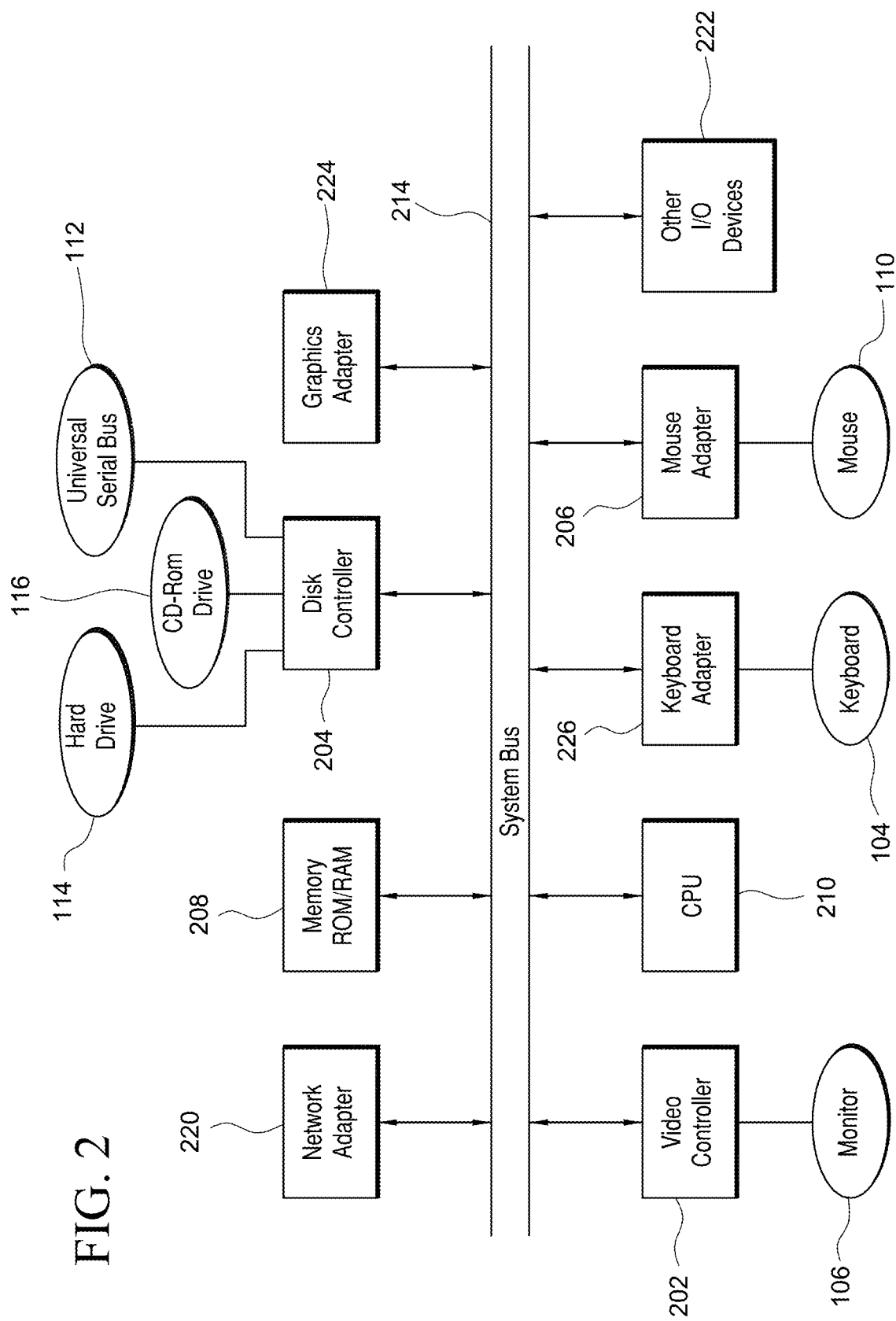
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
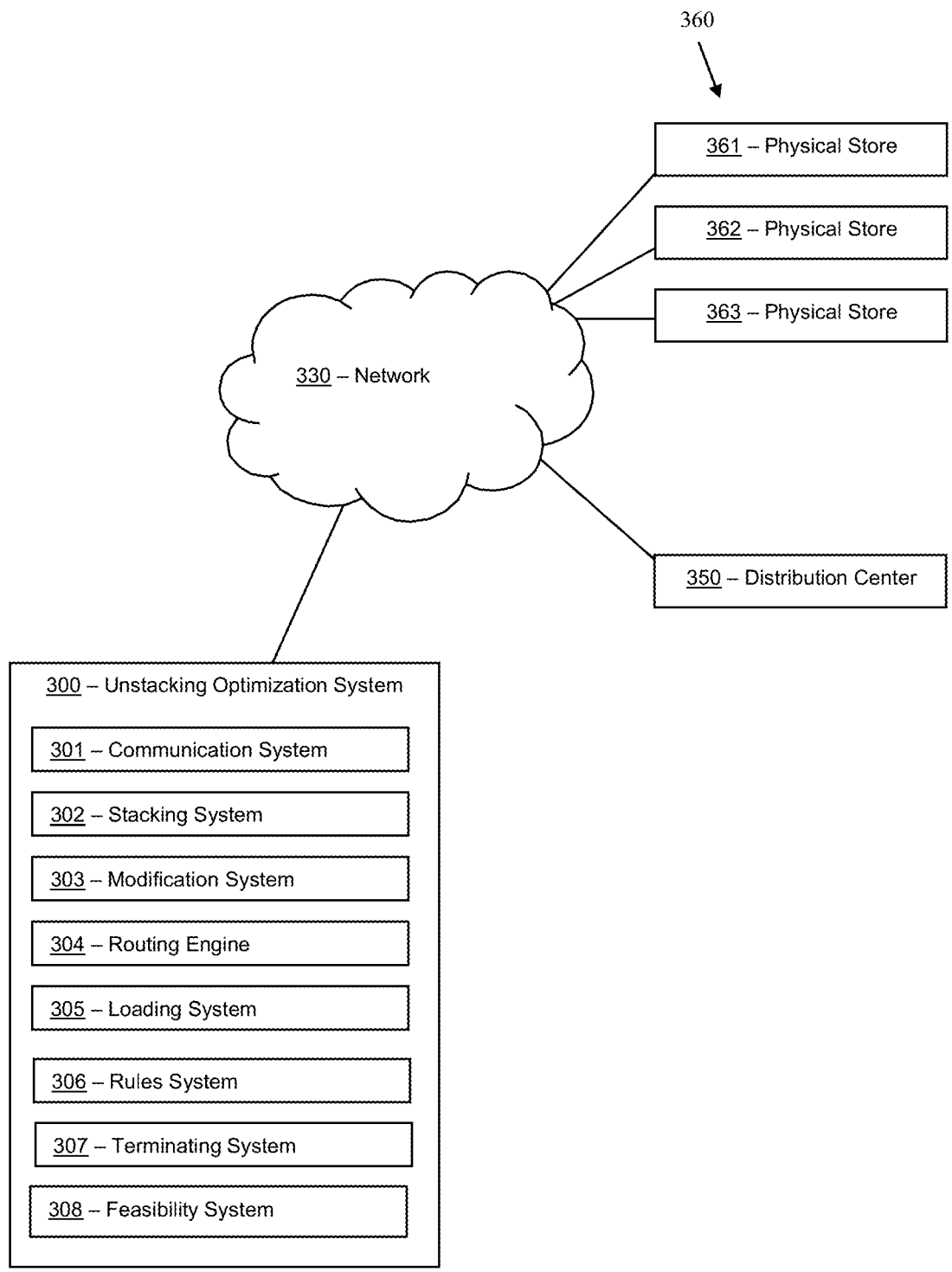
FIG. 3 illustrates a block diagram of a system that can be employed automatically modifying load plans that leave empty floor spots on a trailer floor, according to an embodiment.

Turning ahead in the drawings, FIG. 3 illustrates a block diagram of an unstacking optimization system 300 that can be employed for automatically modifying load plans that leave empty floor spots on a trailer floor. Unstacking optimization system 300 also can automatically reconfigure a feasible load plan with unplanned pallets by unstacking combines and stacks of pallets and moving portions of the unstacked pallets to other locations in the trailer. Unstacking optimization system 300 further can be employed for reducing a number of unplanned pallets in loading plans when some loading requirements cannot be satisfied. Unstacking optimization system 300 is merely exemplary and embodiments of the system are not limited to the embodiments presented herein. The unstacking optimization system 300 can be employed in many different embodiments or examples not specifically depicted or described herein. In some embodiments, certain elements, modules, or systems of unstacking optimization system 300 can perform various procedures, processes, and/or activities. In other embodiments, the procedures, processes, and/or activities can be performed by other suitable elements, modules, or systems of unstacking optimization system 300. Unstacking optimization system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of unstacking optimization system 300 described herein.

In many embodiments, unstacking optimization system 300 can be a computer system, such as computer system 100 (FIG. 1), as described above, and can each be a single computer, a single server, or a cluster or collection of computers or servers, or a cloud of computers or servers. In another embodiment, a single computer system can host unstacking optimization system 300. Additional details regarding unstacking optimization system 300 are described herein.

In some embodiments, unstacking optimization system 300 can be in data communication through a network 330 with physical stores 360, which can include physical stores 361-363, for example, and distribution centers, such as distribution center 350. In several embodiments, each of the physical stores (e.g., 360) and each of the distribution centers (e.g., 350) can be a physical, brick-and-mortar location that are associated (e.g., operated by a common business entity or entities under common control) with unstacking optimization system 300. In many embodiments, the physical stores (e.g., 360) and the distribution centers (e.g., 350) each can include one or more computer systems.

In a number of embodiments, each of physical stores 360 can be a retail store, such as a department store, a grocery store, or a super store (e.g., both a grocery store and a department store). In many embodiments, the distribution centers (e.g., 350) can provide the items sold at the physical stores (e.g., 360). For example, a distribution center (e.g., 350) can supply and/or replenish stock at the physical stores (e.g., 360) that are in a region of the distribution center. In many embodiments, a physical store (e.g., 361-363) can submit an order to a distribution center (e.g., 350) to supply and/or replenish stock at the physical store (e.g., 361-363). In many embodiments, distribution center 350 can be referred to as a warehouse or other facility that does not sell products directly to a customer.

In some embodiments, unstacking optimization system 300 can be a distributed system that includes one or more systems in each of the distribution centers (e.g., 350). In other embodiments, unstacking optimization system 300 can be a centralized system that communicates with computer systems in the physical stores (e.g., 360) and distribution centers (e.g., 350). In some embodiments, network 330 can be an internal network that is not open to the public, which can be used for communications between unstacking optimization system 300, physical stores (e.g., 360), and distribution centers (e.g., 350). In other embodiments, network 330 can be a public network, such as the Internet. In several embodiments, operators and/or administrators of unstacking optimization system 300 can manage unstacking optimization system 300, the processor(s) of unstacking optimization system 300, and/or the memory storage unit(s) of unstacking optimization system 300 using the input device(s) and/or display device(s) of unstacking optimization system 300, or portions thereof in each case.

In several embodiments, unstacking optimization system 300 can include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to unstacking optimization system 300 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of unstacking optimization system 300. In a similar manner, the processors and/or the non-transitory computer-readable media can be local and/or remote to each other.

Meanwhile, in many embodiments, unstacking optimization system 300 also can be configured to communicate with and/or include one or more databases. The one or more databases can include a product database that contains information about products, items, or SKUs (stock keeping units), for example, among other data as described herein, such as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between unstacking optimization system 300, physical stores 360, distribution center 350, and/or the one or more databases can be implemented using any suitable manner of wired and/or wireless communication. Accordingly, unstacking optimization system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

Figure 8:
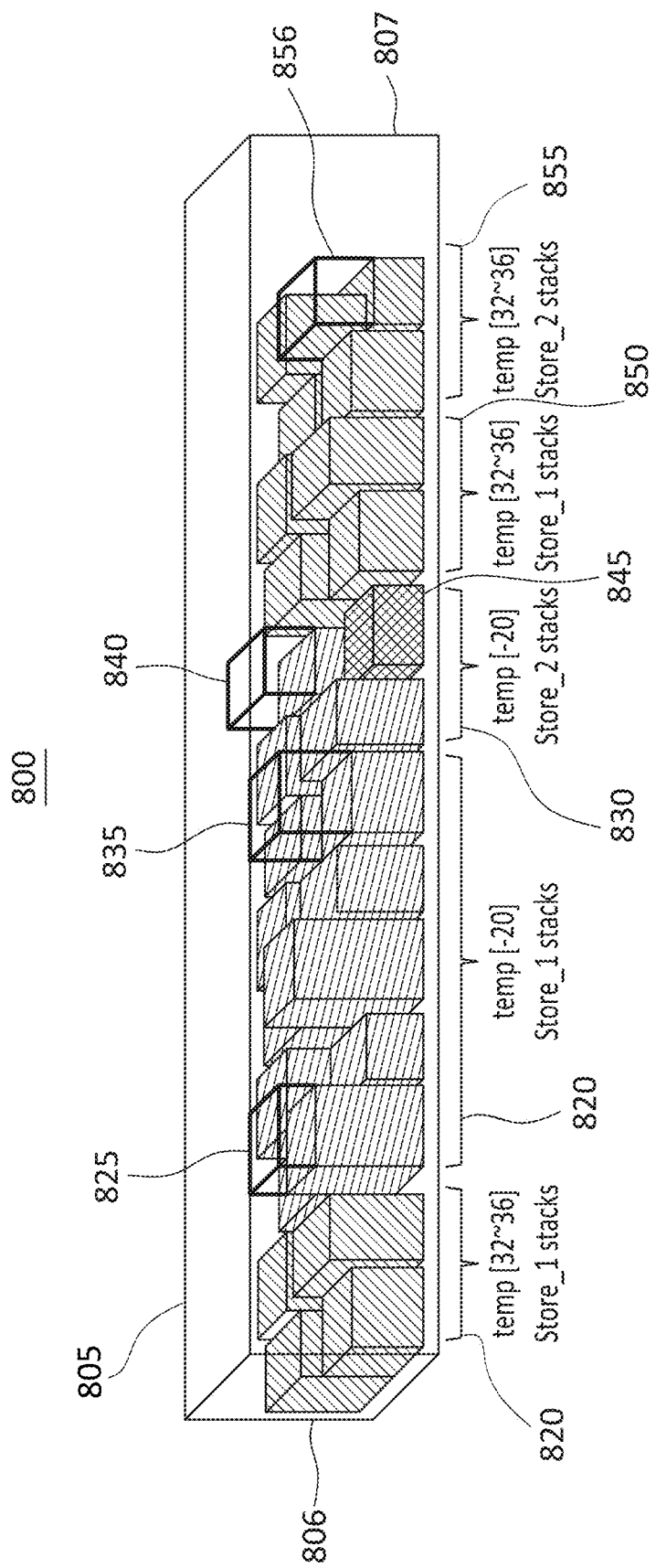
FIG. 8 illustrates a trailer, showing how the trailer can be loaded following a load plan, according to an embodiment.

In several embodiments, unstacking optimization system 300 can re-work a load plan by optimizing pallets on-site reducing the number of pallets combined into stacks within the trailers for these routes. In many embodiments, unstacking optimization system 300 can reduce the number of rolled over routes due to the time and energy used to rework pallets in the trailer following a load plan. In several embodiments, the trailers each can be any form of road haulage shipping container or compartment, such as a semi-trailer, a full trailer, etc. For example, the trailers can be similar or identical to trailer 800, as shown in FIG. 8 and described below.

In many embodiments, unstacking optimization system 300 can include a communication system 301, a stacking system 302, a modification system 303, a routing engine 304, a loading system 305, a rules system 306, a terminating system 307, and/or a feasibility system 308. In many embodiments, the systems of unstacking optimization system 300 can be modules of computing instructions (e.g., software modules) stored at non-transitory computer readable media that operate on one or more processors. In other embodiments, the systems of unstacking optimization system 300 can be implemented in hardware. Unstacking optimization system 300 can be a computer system, such as computer system 100 (FIG. 1), as described above, and can be a single computer, a single server, or a cluster or collection of computers or servers, or a cloud of computers or servers. In another embodiment, a single computer system can host unstacking optimization system 300. Additional details regarding unstacking optimization system 300 and the components thereof are described herein.

Figure 4:
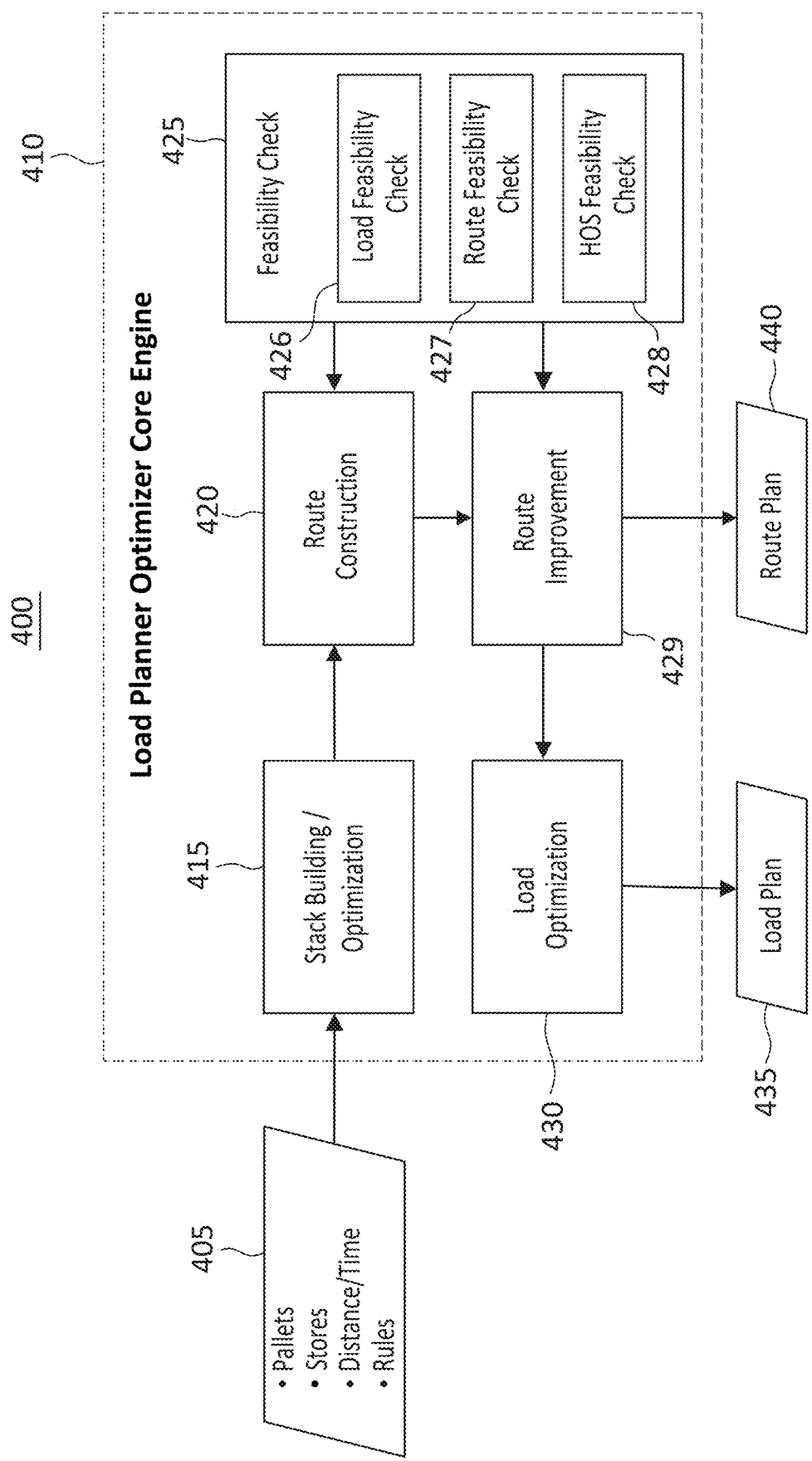
FIG. 4 illustrates a block diagram for a method of acts, modules, and outputs, which can be employed for automatic generation of a load plan and a route plan, according to an embodiment.

Turning ahead in the drawings, FIG. 4 illustrates a block diagram for a method 400 of acts, modules, and outputs, which can be employed for automatic generation of a load plan and a route plan, according to an embodiment. The automatic generation of a load plan and a route plan can be similar or identical to the automatic generation of load and route design and activities shown and described in U.S. patent application Ser. No. 16/777,498, filed Jan. 30, 2020 (referred to herein as the "'498 Patent Application"), and the '498 Patent Application is incorporated herein by reference in its entirety. Various activities associated with method 400 can be similar or identical to various activities described in the '498 Patent Application. In several embodiments, method 400 can be employed in many different embodiments or examples not specifically depicted or described herein. In a number of embodiments, certain elements of method 400 can perform, involve, and/or be generated by various procedures, processes, and/or activities. In some embodiments, the procedures, the processes and/or the activities of method 500 can be performed in any suitable order. In other embodiments, the procedures, processes, and/or activities can be performed by, and the outputs can be generated by, other suitable elements of method 400. In many embodiments, method 400 can be implemented by unstacking optimization system 300 (FIG. 3).

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as unstacking optimization system 300. The processor(s) can be similar or identical to the processor(s) described above with respect to computer system 100 (FIG. 1).

In several embodiments, method 400 can include a block 405 of receiving input parameters for that can be used in generating a load plan. In many embodiments, block 405 of receiving input parameters also can be used to generate a route plan to deliver pallets of goods or items of orders to predetermined destinations in a predetermined order.

In various embodiments, block 405 of input parameters can include store pallets with various commodities (e.g., goods, items) order by a store, a DC, and/or another suitable entity. In some embodiments, other input parameters can include a sequence of routes and/or stops in a route plan where each order for a respective store is transported and delivered on the route plan. Such input parameters can include a distance and a transportation time from a DC to each stop in between and a return time back to a DC. In various embodiments, block 405 further can include pallet parameters: (a) length, width, height, and/or weight, (b) pallet attributes for temperature constraints (e.g., frozen, refrigeration, and/or dry pallets), (c) stacking rules such for each store, trailer axle distribution, and/or other suitable stacking rules, (d) dimension and configuration of trailers including dry trailers, temperature controlled trailers, tri-temperature trailers, and/or another suitable trailer configuration, and (e) loading rules that can include Department of Transportation (DOT) rules and/or another suitable loading rule. In many embodiments, method 400 can proceed after block 405 to a block 410.

In some embodiments, method 400 can include block 410 of utilizing a load planner optimizer core engine to generate a load plan and a route plan. In several embodiments, load plan and route plan can be similar or identical to the activities described in block 435 and block 440. In several embodiments, block 410 can include can include various acts, modules, and outputs which can include a block 415 of building stacks, block 420 of constructing a route, block 425 of running a feasibility check on each route, block 445 of improving the route after the each feasibility check, block 450 of optimizing the load, block 460 of outputting the route plan, and/or block 455 of outputting a load plan. Method 400 can proceed after block 410 to block 415.

In various embodiments, block 415 of building stacks can be employed to build stacks of pallets based on a number of orders for delivery to another location or destination, such as a store or a distribution center (DC). In some embodiments, block 415 can include building store stacks where each stack includes one or more pallets transport to each store. In several embodiments, block 415 also can be employed to build or optimize stacks of pallets that are load feasible. In some embodiments, a load feasible load plan can include compliance with rules, regulations, vehicle constraints, and Department of Transportation restrictions. In various embodiments, building stacks (e.g., stack building) of pallets can include a loading design. In many embodiments, such a loading design can include (1) designing a route plan with multiple stops each including multiple pallets or stacks, and (2) designing a load plan for a tractor-trailer vehicle with two axles and a trailer that can carry dry items or goods and/or a tri-temperature trailer that can carry frozen or refrigerated items or goods. In a number of embodiments, stack building and/or optimizing stacks already built can include constructing stacks by piling up pallets for a same store location and/or by a same temperature-range to preserve the integrity of items or goods shipped during transport. In various embodiments, constructing stacks of individually packed pallets are also known as a combine. In many embodiments, block 415 of stack building or optimizing stacks can include reducing a 3-dimensional bin packing problem to a 2-dimensional bin packing problem. In several embodiments, method 400 can proceed after block 415 to a block 420.

In various embodiments, method 400 can include block 420 of constructing a route plan based on orders for delivery to another location. Such locations can include a DC, a Store location, and/or another suitable delivery location. In several embodiments, block 420 of constructing a route plan for a delivery can include a sequence or series of delivery stop that can influence the way in which a load plan is designed to load combines in an ordered sequence and/or a frozen or refrigerated bulkhead sections of a tri-temperature trailer. In some embodiments, method 400 can proceed after block 420 to a block 425.

In a number of embodiments, method 400 can include block 425 of implementing multiple feasibility checks on a current route design constructed in block 420. In some embodiments, block 425 can include multiple feasibility checks such as load feasibility check 426, route feasibility check 427, and/or Hours of Service (HOS) feasibility check 428. The load feasibility check and the route feasibility check can be similar or identical to the enhanced load feasibility check and the route feasibility check activities shown and described in U.S. patent application Ser. No. 17/163,428, filed Jan. 30, 2021, (referred to herein as the "'428 Patent Application"), and the '428 Patent Application is incorporated herein by reference in its entirety. Various activities associated with block 425 can be similar or identical to the activities described in the '498 Patent Application and/or the '428 Patent Application. In various embodiments, method 400 can proceed after block 425 to a block 429.

In some embodiments, method 400 can include block 429 of generating an improvement to a route plan or a route using the output of the feasibility checks in block 425. In several embodiments, method 400 can proceed after block 429 to a block 430 and/or a block 440.

In a number of embodiments, method 400 can include block 440 of generating a route plan based on the reconfigured route plan output from block 429.

In several embodiments, method 400 can include block 430 of optimizing a load after incorporating the reconfigured route plan with improvements of block 429. In many embodiments, load optimization can include optimizing a position of each stack such as creating a combine by stacking as many pallets as possible and/or locating a floor position for the combine or load in the trailer based on a 2-Dimensional (2-D) perspective of how each combine and/or stack fits within the trailer parameters and/or temperature controlled bulkheads. In various embodiments, load optimization follows loading rules in generating feasible load plans. In some embodiments, loading rules can include conditions or restrictions for each loading design or load, such as (1) trailer dimension requirements, (2) axle weight limitations, (3) curbside and/or road weight balance requirements, and (4) minimizing unnecessary unloading of stacks in the load design. For example, if there are empty floor spots in a trailer after the trailer is loaded based on a 2-D load design plan or a load plan, it can indicate that some combines can be unnecessary. In several embodiments, reducing combines or keeping combines in a load plan to a minimum can provide a several benefits such as a saving on labor activities, increasing dock flow, and increasing capacity to load trailers completely without unplanned pallets. In some embodiments, loading a trailer (e.g., a 3-D perspective) based on a 2-D load plan that is feasible can still observe unplanned pallets and/or empty floor spots as output from the loading plans since some loading requirements are left unsatisfied, thus changing a 2-D feasible load plan into a 3-D unfeasible load plan. In several embodiments, block 435 can include enhancing a previous load design with empty floor spots or unplanned pallets by reducing and moving selected combines in a trailer. In many embodiments, method 400 can proceed after block 430 to a block 435.

In various embodiments, method 400 can include block 435 of generating an original load plan and/or a reconfigured load plan as output by the activities described in connection with block 410.

Figure 5:
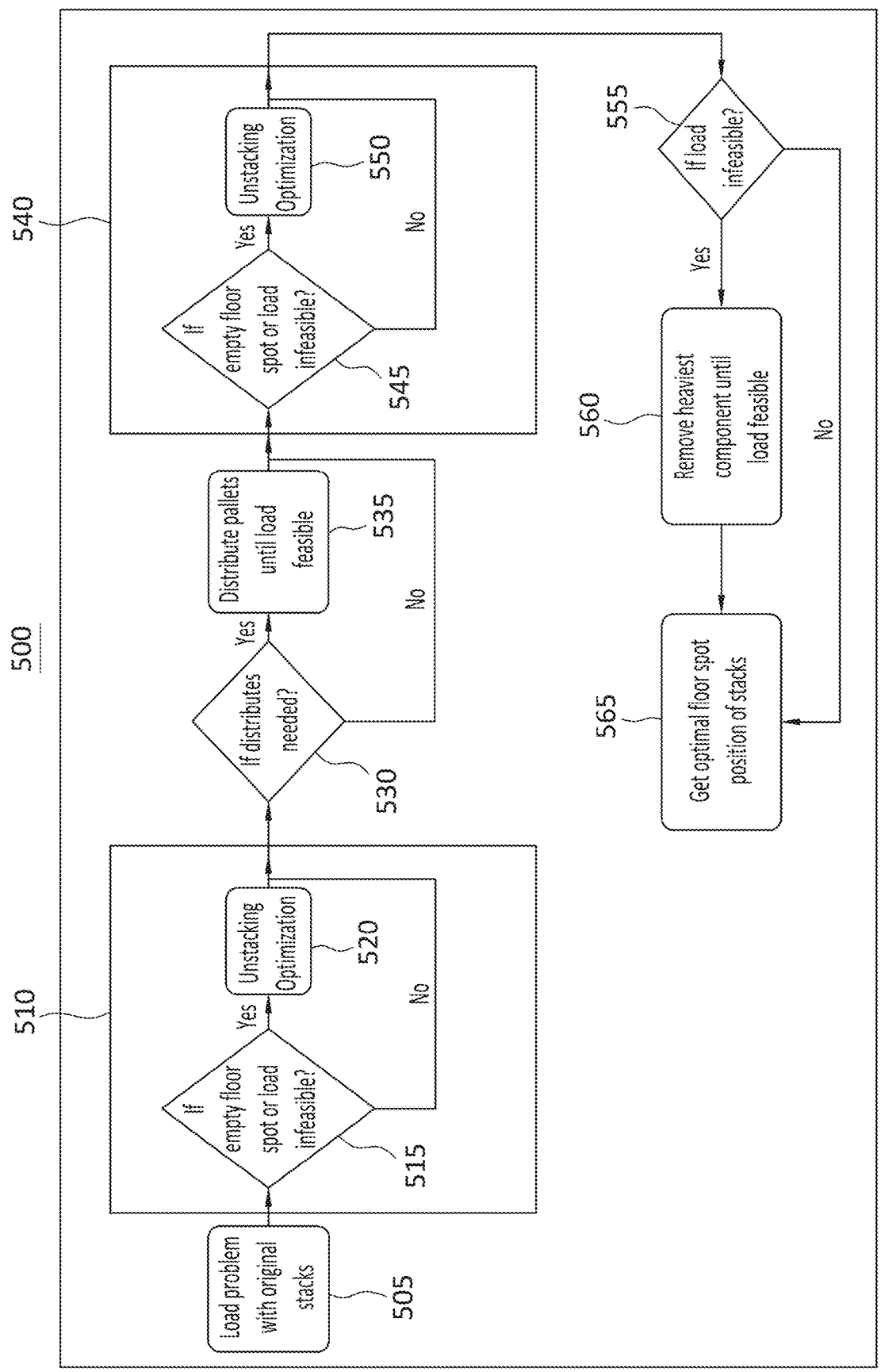
FIG. 5 illustrates a flow chart for a method of building optimal loading plans, according to an embodiment.

Moving forward in the drawings, FIG. 5 illustrates a flow chart for a method 500 of building optimal loading plans based on an original load plan observing load problems, such problems can include unplanned pallets remaining and/or empty floor spots in a trailer, according to an embodiment. Method 500 also can be employed for assigning an optimal floor spot position in a transportation vehicle upon which to load or place a pallet or a stack of pallets. Method 500 is merely exemplary and is not limited to the embodiments presented herein. Method 500 can be employed in many different embodiments or examples not specifically depicted or described herein. In some embodiments, the procedures, the processes and/or the activities of method 500 can be performed in any suitable order. In still other embodiments, one or more of the procedures, the processes, and/or the activities of method 500 can be combined or skipped. In several embodiments, unstacking optimization system 300 (FIG. 3) can be suitable to perform method 500 and/or one or more of the activities of method 500.

In these or other embodiments, one or more of the activities of method 500 can be implemented as one or more computing instructions configured to run at one or more processors and configured to be stored at one or more non-transitory computer-readable media. Such non-transitory computer-readable media can be part of a computer system such as unstacking optimization system 300. The processor(s) can be similar or identical to the processor(s) described above with respect to computer system 100 (FIG. 1).

In various embodiments, method 500 illustrates an example of building optimal load plans using an iterative feedback loop to output optimal floor spot positions for respective stacks from the original load plan and/or an updated load plan. In some embodiments, the original load plan can be similar or identical to the activities described above in connection with block 435 (FIG. 4). In various embodiments, building an optimal load plan can begin with load problems with the original stacks in the original load plan and/or updated load plan (e.g., create load plan call).

In several embodiments, such load problems can include creating unplanned pallets and/or ending up with empty floor spots on the trailer based on the parameters of the load plan created for a trailer size. In some embodiments, after loading a trailer following a load plan, there can be unplanned pallets remaining that are part of that load plan. In various embodiments, a load plan that is feasible can include a number of pallets and/or stacks of pallets matching each delivery stop within the route plan. Such pallets and/or stacks of pallets can be similar or identical to the block 415 (FIG. 4). In a number of embodiments, an updated load plan can include a different list of stacks for a trailer where the loading requirements are not satisfied, thus some pallet and/or stacks can become unplanned after the remaining pallets and/or stacks are loaded to the trailer. In many embodiments, one or more discrepancies can create load problems such as (i) an incorrect pallet input, (ii) another configured parameter input is incorrect (e.g., a manual change occurred), (iii) correct pallet input, incorrect trailer types with different dimensions such as height, temperature controlled bulkheads, and/or another suitable discrepancy in a load plan and/or updated load plan.

In a number of embodiments, a load plan output by a load planner can be created as a feasible loading plan for a designated trailer. In several embodiments, after the stacks and/or combines are physically loaded into the designated trailer, generating unplanned pallets that are pallets unable to be loaded and/or added to empty floor positions in the trailer. Such a load planner can be similar or identical to activities described above in connection with FIG. 4. Conventionally, a load plan output by such a load planner is unchanged throughout building routing and load plans. After implementing physical loading plans based the load plan in the designated trailer, if there are empty floor spots (e.g., positions) then a manual post-process from engineering teams can be used to try to unstack pallets or reduce combines while maintaining loading requirements that can be time consuming and prevent loads from being transported in a scheduled time frame. If some loading requirements are unable to be satisfied, then there will be unplanned pallets created that cannot be loaded in the trailer as part of the load plan.

In some embodiments, method 500 can include a block 505 of inputting a load plan with original pallets stacked. In several embodiments, block 505 also can include inputting a load with a load problem based on the original pallet stack design and/or placement on the floor of a transportation trailer. In some embodiments, a load problem can occur after loading the pallets and pallet stacks (e.g., combines) into a trailer. In various embodiments, load problems and/or loading problems can include empty floor spots, a load becomes infeasible, empty pallets, and/or another suitable unanticipated load problem. In various embodiments, method 500 can proceed after block 505 to a block 510.

In several embodiments, method 500 can include a block 510 of determining when to conduct or implement an unstacking optimization process. Method 500 also can include a block 540 of determining when to conduct or implement a second iteration of an unstacking optimization process. In some embodiments, block 510 can implement block 515 as a first implementation of an unstacking process to generate a feasible load based on initial input data from block 505 of the load problem with original stacks. If the load is infeasible or the load problem generated empty floor spots, block 520 can run a series of iterations. Block 515 and block 520 are described in further detail below. Similarly, block 540 can be similar or identical to block 510 in the implementation of a second unstacking process. In several embodiments, block 540 can implement block 545 as a second implementation of the unstacking process to generate a feasible load based on reconfigured data from block 535. Block 545 and block 550 are described in further detail below.

In various embodiments, block 510 can include block 515 of determining whether or not the load problem includes empty floor spots on the trailer floor after implementing the load plan and/or the load of the load plan is infeasible. If block 515 is yes, method 500 can proceed to a block 520. Otherwise, block 515 is no, then method 500 can proceed to a block 530. In many embodiments, block 515 can be similar or identical to block 545.

In a number of embodiments, block 510 can include block 520 of implementing an unstacking optimization algorithm to output a reconfigured set of data for use in block 530. In some embodiments, block 515 can be used as input into block 520. In some embodiments, block 520 and block 550 can be implemented as described below in connection with FIG. 6. In various embodiments, method 500 can proceed after block 520 to a block 530.

In various embodiments, method 500 can include a block 530 of determining whether or not to conduct a distribution of the pallets on the trailer floor. In several embodiments, changing stacks or combines can offset a number of vehicle constraints, stacking rules, and/or loading rules that convert a feasible load plan into an infeasible load plan preventing the trailer from leaving a location to deliver the load via the route plan. In some embodiments, each route plan can account for specific departure times and arrival times to each stop along the sequence of stops in the route plan compliant with Hours of Service Rules, DOT rules, and/or Store rules. If block 530 is yes, method 500 can proceed to a block 535. Otherwise, block 530 is no, then method 500 can proceed to a block 545. Block 530 can be implemented as described below in FIG. 6.

In several embodiments, method 500 can include block 535 of distributing pallets until a load becomes feasible. In various embodiments, block 535 can include a series of iterations implemented as part of a feedback loop, where each iteration outputs a reconfigured set of data that is used as input into the next feedback loop until the feedback loop terminates. In many embodiments, the feedback loop terminates when (1) either a final output from a final iteration includes a reconfigured load plan that has become feasible or (2) after a predetermined number of iterations are performed but the load is still infeasible. In several embodiments, if the load is infeasible and the feedback loop terminates, block 535 becomes a null response where the flow chart terminates at this point. In various embodiments, when the load is feasible after distributing the pallets, method 500 can proceed from block 535 to a block 540.

In various embodiments, similar to block 510, method 500 also can include block 540 of determining when to conduct or implement a second iteration of an unstacking optimization process. Similarly, block 540 can be similar or identical to block 510 in the implementation of a second unstacking process. In several embodiments, block 540 can implement block 545 as a second implementation of the unstacking process to generate a feasible load based on reconfigured data from block 535. In many embodiments, method 500 can proceed after block 540 to a block 545, a block 550, and/or a block 555.

In many embodiments, block 540 can include block 545 of determining whether or not the load problem includes empty floor spots on the trailer floor after implementing the load plan and/or the load of the load plan is infeasible based on reconfigured data from block 530 or block 535. If block 545 is yes, method 500 can proceed to a block 550. Otherwise, block 545 is no, then method 500 can proceed to a block 555.

In a number of embodiments, block 540 can include block 550 of implementing an unstacking optimization algorithm based on another reconfigured set of data from block 545 for use in block 555. In some embodiments, block 550 can be used as input into block 520. In many embodiments, block 550 can be similar or identical to block 520. In various embodiments, method 500 can proceed after block 550 to a block 555.

In many embodiments, method 500 can include a block 555 of determining whether the load is feasible based on the reconfigured data from block 545 or block 550. If yes, method 500 can proceed to block 560. Otherwise, block 555 is no, then method 500 can proceed to block 565.

In various embodiments, method 500 can include a block 560 of removing a heaviest component in the load until the load is feasible. In several embodiments, block 560 can be repeated a number of times until the load becomes feasible. In some embodiments, method 500 can proceed after 560 to block 565.

In some embodiments, method 500 can include block 565 of identifying (e.g., getting) optimal floor spot positions for placement of the pallets or stacks of pallets based on the feasible load generated by multiple iterations of method 500.

Figure 6:
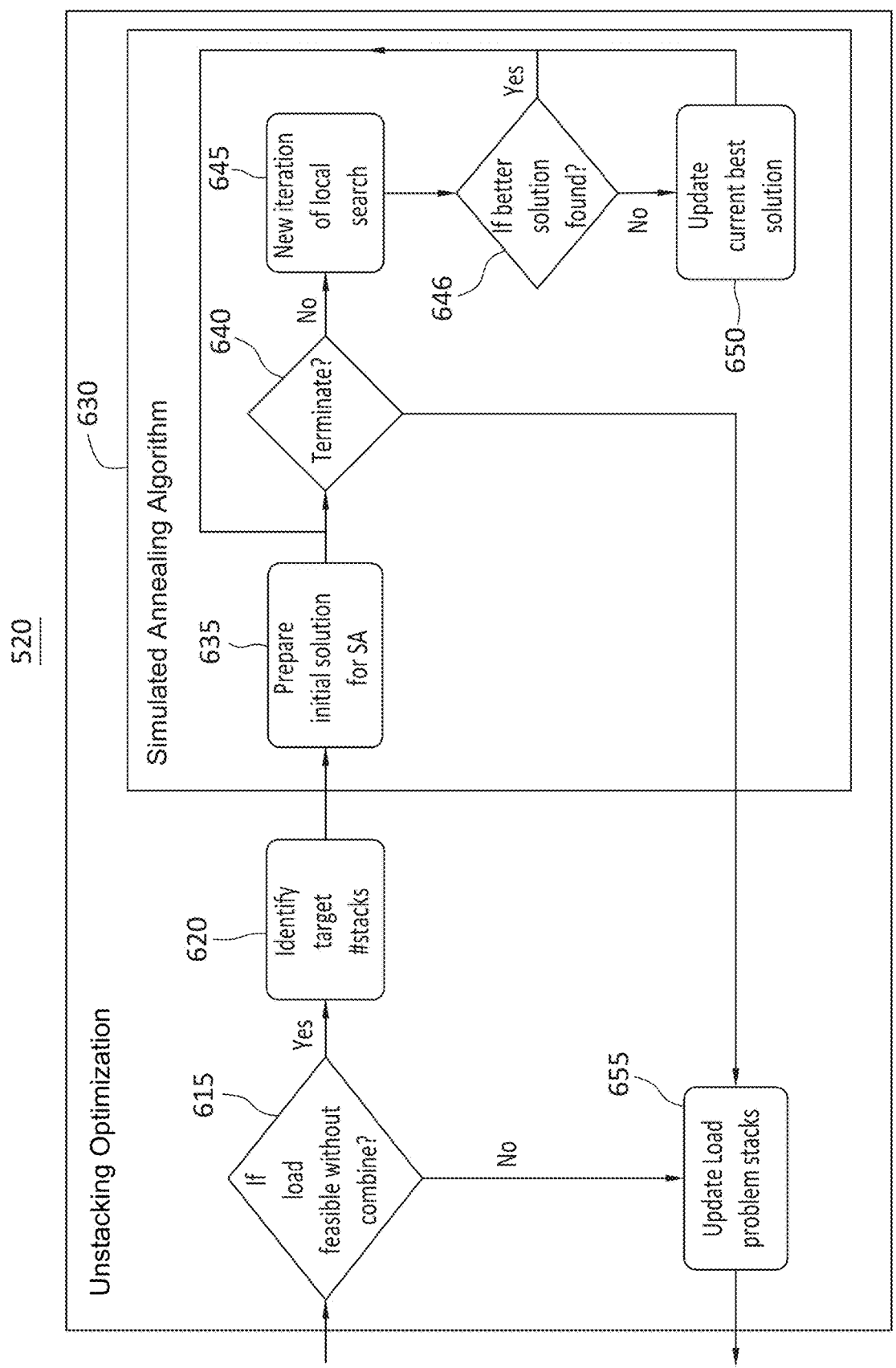
FIG. 6 illustrates a flow chart for implementing an unstacking optimization algorithm to output a reconfigured set of data for consideration of whether or not to generate iterations of new load solutions, according to an embodiment of FIG. 5.

Turning ahead in the drawings, FIG. 6 illustrates a flow chart for block 520 of implementing an unstacking optimization algorithm to output a reconfigured set of data for consideration of whether or not to generate iterations of new load solutions. In several embodiments, block 520 shown in FIG. 6 can be a subset of activities for blocks 520 (FIG. 5) and/or block 550 (FIG. 5), such that descriptions in connection with block 520 can describe the activities for block 550, and vice versa.

In some embodiments, block 520 can include implementing an unstacking optimization framework using simulated annealing algorithms where original stacks built for each store is used as input. In several embodiments, unstacking optimization leverages the simulated annealing framework to minimize combines. Such a framework can include: (1) using a variety of local search techniques to swap pallets between stacks, where such techniques can include one-zero exchange or two-zero exchange, (2) utilizing a variety of feasibility checks while conducting each local search, and (3) utilizing iterative solutions with reconfigured data (e.g., load plans) that are probabilistically accepted and/or rejected where each accepted and rejected data is used in each next iteration of a better solution over the previous solution.

In various embodiments, recombining or unstacking combines can be used to resolve an optimal floor spot position for each stack. An advantage of unstacking optimization framework includes a fast response time to the load problems of less than 500 milliseconds to resolve the loading problems. In several embodiments, blocks 520 (FIG. 5) and/or block 550 (FIG. 5) can be implemented as described below in connection with FIGS. 7, 8, and 9.

In many embodiments, block 520 can include a block 615 of determining whether or not a load is feasible without combination stacks or combines. If yes, block 615 can proceed to block 620. Otherwise, block 615 is no, and can proceed to a block 655.

In various embodiments, block 520 can include block 620 of identifying a target number of the combination stacks and/or pallet stacks. Block 520 can proceed after block 620 to a block 630. In many embodiments, block 520 can be implemented as described below in FIG. 6 and FIG. 7.

In several embodiments, block 520 can include a block 630 of how implementing a simulated annealing algorithm can update a reconfigured set of data into a current or best load solution. In some embodiments, block 630 can also determine when to terminate the iterations run during the simulated annealing machine learning process. In various embodiments, a simulated annealing algorithm used in a machine learning model can include an input of historical reconfigured data over a period of time and output an updated solution. In some embodiments, training data for use in the machine learning model can be trained on historical load data over a period of time and updating the training data using a feedback loop of reconfigure data output from the machine learning model. Such a feedback loop allows the machine learning model to learn from previous iterations of reconfigured load that are feasible and/or not feasible loads. In a number of embodiments, input of original stacks can include stack building and optimized stacks for each store in a respective load plan. Such stack building and optimized stacks can be similar or identical to activities described in block 415 (FIG. 4).

In many embodiments, the input data processed using the simulated annealing algorithm in the machine learning model can include a number of previous initial solutions and/or historical load plans over a period of time. In a number of embodiments, block 630 can include a block 635 (preparing the input data for the machine learning model), a block 640 (terminating the simulated annealing algorithm), a block 645 (running a new search), a block 646 (determining if a solution is found), a block 650 (updating a current solution) and/or block 655 (updating stacks). The simulated annealing algorithm can be similar or identical to the simulated annealing algorithm shown and described in U.S. patent application Ser. No. 16/777,498, filed Jan. 30, 2020, (referred to herein as the "498 Patent Application"), and the '498 Patent Application is incorporated herein by reference in its entirety.

In several embodiments, block 630 can include block 635 of preparing an initial solution based on the number of stacks or combines identified to modify or reconfigure an infeasible load into a feasible load. In many embodiments, block 630 can proceed after block 635 to a block 640 and/or a block 650.

In some embodiments, block 630 can include block 640 of determining when to terminate the simulated annealing algorithm. If yes, block 640 can proceed to block 655. Otherwise, block 640 is no and can proceed to block 645.

In various embodiments, block 630 can include block 645 of generating a new iteration of a local search based on the reconfigured data received from block 635. In several embodiments, a local search can include two types of operations: one-zero-exchange and two-zero-exchange. In some embodiments, during each iteration the algorithm randomly chooses one of the two types of operations based on a pre-specified probability parameter. In many embodiments, one-zero-exchange can include randomly choosing (e.g., selecting) one pallet, removing the pallet from its current stack location, and re-inserting the pallet into another randomly selected stack location (e.g., top, bottom, or middle of the stack). In several embodiments, using one-zero-exchange can generate a new list of stacks with minor differences from the current list of stacks, thus called as a local search operation. In a number of embodiments, similarly, two-zero-exchange also can include randomly choosing two pallets selected from a same stack or a different stack, and re-inserting each of the two selected pallets into other different randomly selected stacks. In several embodiments, if a current solution (e.g., list of stacks) is load feasible, satisfying loading requirements, the new solution with minor changes performed by a local search can also be load feasible. In some embodiments, an advantage of running a local search can include maintaining the feasibility of a new solution (e.g., list of stacks) while looking for potential improvements, such as a reduction in unnecessary combines. In various embodiments, block 645 can be similar or identical to activities describe above in block 520 (FIG. 5). In many embodiments, block 630 can proceed after block 645 to block 646.

In a number of embodiments, block 630 can include block 646 of determining whether a better load solution is found from the previous load solution. In some embodiments, block 646 can output a number of reconfigured load plans converting a load plan that has become infeasible to a new load plan that is feasible. If yes, block 646 can select to return to block 640 to proceed to terminate the simulating annealing algorithm loop. Once block 640 is terminated, block 650 can proceed to block 655. Otherwise, block 646 is no, and also can select to proceed to block 640 then proceed to block 655. In various embodiments, if yes, block 646 can return to block 640 and instead of terminating the simulated annealing algorithm, can proceeds to blocks 645, 646, and 650, until a current best solution is found.

In various embodiments, block 630 can include block 650 of updating a reconfigured load plan with a current and/or best solution that previous iterations. In some embodiments, block 650 can output a number of reconfigured load plans converting a load plan that has become infeasible to a new load plan that is feasible. In many embodiments, block 630 can proceed after 650 to a block 655.

In several embodiments, block 520 can include block 655 of updating the previous load stack plan with a reconfigured load stack plan resolving the load problem. After block 655, block 520 can proceed by returning to FIG. 5. Block 520 and block 550 (FIG. 5) can include similar or identical unstacking optimization procedures that can be implemented in connection with FIG. 6.

Figure 7:
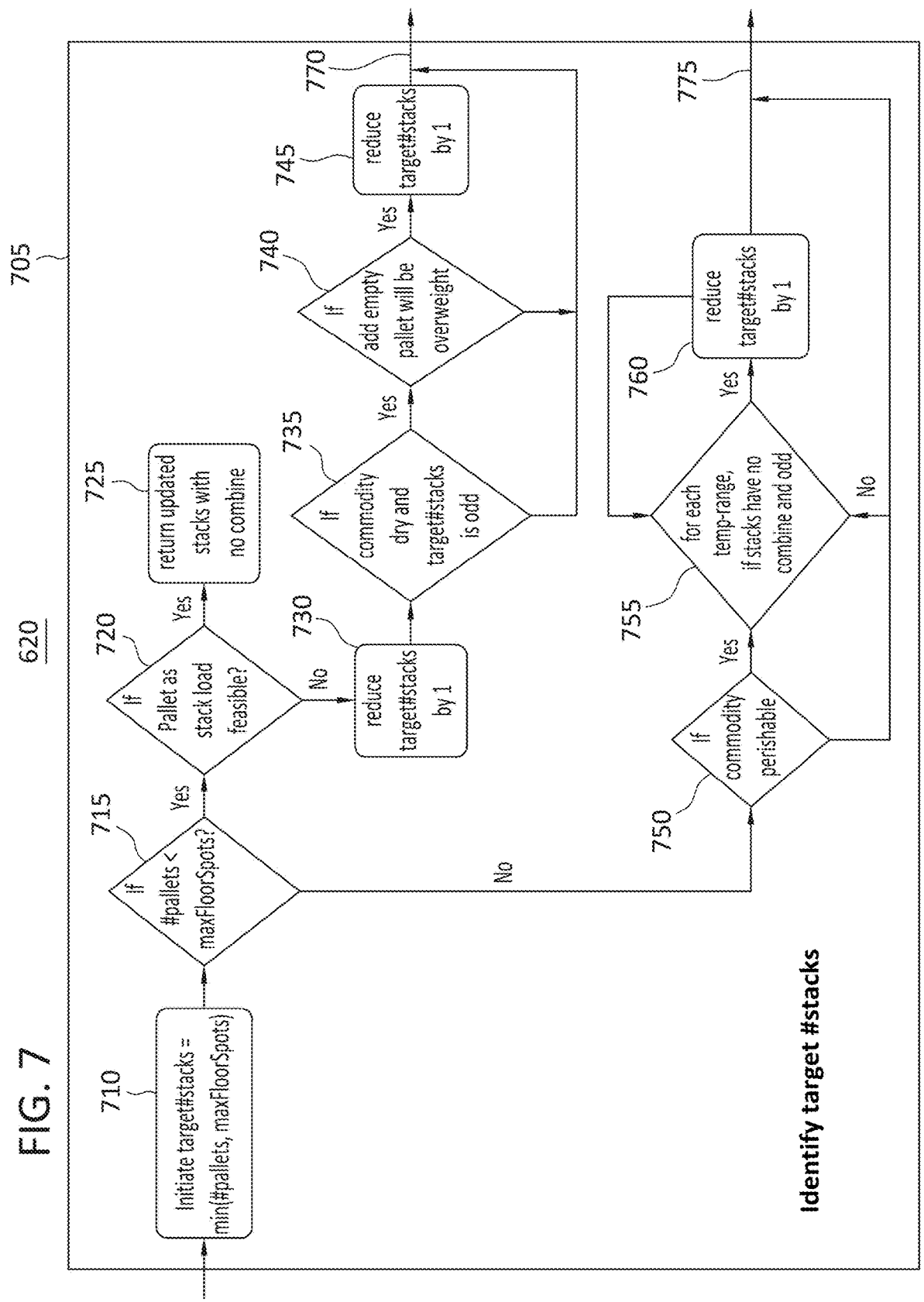
FIG. 7 illustrates a flow chart for a block of identifying a target number of the combination stacks, according to an embodiment of FIG. 6.

Moving forward in the drawings, FIG. 7 illustrates a flow chart for block 620 (FIG. 6) showing how to identify a target number of the combination stacks and/or pallet stacks. In some embodiments, block 620 can include a method 705 used to identify a target number of stacks or combines for a maximum number of floor spots available in a trailer.

In many embodiments, method 705 can include a block 710 of initiating a target number of stacks and/or combines as input into block 715. In some embodiments, initiating the target number of stacks and/or combines can be based on equation (1), as follows:

$$\text{Initiate target \# stacks} = \min(\text{\# pallets}, maxFloorSpots) \qquad (1)$$

where "min" means the smaller one among two values. If #pallets (number of pallets) is less than the maxFloorSpot, the output is #pallets; otherwise the output is maxFloorSpot.

In several embodiments, if the number of pallets is less than the max floor spot of the trailer, a best scenario can include loading each stack as a single pallet onto the trailer, where no combines are needed and the number of stacks equals the number of pallets. In some embodiments, otherwise, the best scenario can include using up all the floor spots of the trailer, where some combines are necessary and the number of stacks equals the maximum number of floor spots in the trailer. Therefore, the initial target number of stacks for the unstacking optimization can be the smaller value between the number of pallets and the maximum floor spots available in the trailer. In a number of embodiments, an advantage of using the Simulated Annealing algorithm can be that whenever the number of stacks reaches this target value, the optimal solution can be obtained without further improvement. In various embodiments, method 705 can proceed after block 710 to a block 715. In several embodiments, block 710 can be implemented as described above in connection with blocks 615, 620, 630 and/or 655 (FIG. 6).

In a number of embodiments, method 705 can include block 715 of determining whether the number of pallets and/or stacks (e.g. combines) are greater than the maximum number of Floor Spots in a trailer. If block 715 is yes, method 705 can proceed to block 720. Otherwise, block 715 is no, method 705 can proceed to block 750. In several embodiments, block 715 can be implemented as described above in connection with FIG. 6.

In some embodiments, method 705 can include block 720 of determining whether or not a pallet as stacked or arranged in the trailer floor is load feasible. In many embodiments, determining whether a load is feasible can be dependent upon stacking rules or protocols, store rules or restrictions, DOT restrictions, and another suitable type of stacking a load restriction. If block 720 is yes, then method 705 can proceed to a block 725. Otherwise, block 720 is no, then method 705 can proceed to a block 730. In several embodiments, block 720 can be implemented as described above in connection with FIG. 6.

In various embodiments, method 705 can include block 725 of returning updated stacks or reconfigured stacks with no combines. In several embodiments, block 725 can be implemented as described above in connection with FIG. 6.

In a number of embodiments, method 705 can include block 730 of reducing a target number of stacks by 1 pallet and/or stack, where the data is reconfigured and used to update the placement of the stacks and combines for each load. In many embodiments, reconfiguring a stack and/or pallets can include feasibility checks to monitor violations of numerous regulations and/or store restrictions, such as trailer physical restrictions, trailer compartment restrictions, pallet and/or combines temperature restrictions and/or another suitable load restriction. In some embodiments, method 705 can proceed after block 730 to a block 735.

In many embodiments, method 705 can include block 735 of determining if a dry commodity of a target number of stacks (e.g., combines) is an odd number of stacks. If block 735 is yes, method 705 can proceed to a block 740. Otherwise, block 735 is no, then method 705 can proceed to block 770. In some embodiments, block 735 can be implemented as described above in connection with FIG. 6.

In a number of embodiments, method 705 can include block 740 of determining whether or not adding an empty pallet to the trailer floor exceeds a weight restriction of the load where the load becomes overweight thus infeasible. If block 740 is yes, method 705 can proceed to a block 745. Otherwise, block 740 is no, then method 705 can proceed to block 770. In some embodiments, block 740 can be implemented as described above in connection with FIG. 6.

In several embodiments, method 705 can include block 745 of reducing a number of target stacks or combines by one stack or pallet to maintain a load that is feasible. In many embodiments, method 705 can proceed after block 745 to block 770. In some embodiments, block 745 can be implemented as described above in connection with FIG. 6.

In some embodiments, method 705 can include block 750 of determining whether or not a stack or combine is carrying or transporting perishable items or goods. If block 750 is yes, method 705 can proceed to block 755. Otherwise block 750 is no, and method 705 can proceed to block 775. In some embodiments, block 750 can be implemented as described above in connection with FIG. 6.

In several embodiments, method 705 can include block 755 of determining whether or not for each stack or stack of pallets that is temperature dependent includes a combine. In many embodiments, block 755 of determining whether or not for each stack or stack of pallets that is temperature dependent has an odd number of stacks or combines. If block 755 is yes, method 705 can proceed to a block 760. Otherwise, block 755 is no, and method 705 can proceed to block 775. In some embodiments, block 755 can be implemented as described above in connection with FIG. 6.

In a number of embodiments, method 705 can include block 760 of reducing a target number of stacks by 1 stack or pallet. Method 705 can proceed after block 760 to block 775. In some embodiments, block 760 can be implemented as described above in connection with FIG. 6.

In various embodiments, method 705 can include block 770 of outputting a reconfigured number of target stacks based on the maximum floor spots in a trailer based on dry commodity pallets. Method 705 can proceed after block 770 back to block 620 (FIG. 6) to be used as input for block 630 of simulated annealing algorithm used in machine learning models (e.g., a simulated annealing framework).

In some embodiments, method 705 can include block 775 of outputting a reconfigured number of target stacks based on the maximum floor spots in a trailer based on perishable commodity pallets. In some embodiments, block 775 can be implemented as described above in connection with FIG. 6.

Turning ahead in the drawings, FIG. 8 illustrates a trailer 800, showing how trailer 800 can be loaded following a load plan 805 (e.g., loading plan) where some pallets are left out of the trailer and are unable to be loaded (e.g., unplanned pallets). In some embodiments, the load plan complies with the route plan and/or updated route plan. Such a load plan and a route plan can be similar or identical to the activities described above in connection with FIG. 4.

Trailer 800 shown in FIG. 8 illustrates a transparent view of the inside of the exemplary trailer according to load plan 805. In this example, the tri-temperature trailer is illustrated from left to right as the nose section 806 until the rear section 807 and the middle chamber section for frozen pallets. Further, the exemplary tri-temperature trailer includes compartments for stacks of pallets or each pallet for freezer pallet sections (middle chamber section) to store the frozen goods or items on frozen pallets at temperatures −20 degrees Fahrenheit (F) and dry pallet sections to store dry goods or items on dry pallets at temperatures between 32 and 35 degrees F. In this example, stacks for Store_1 were originally loaded in the nose section 806 at locations 810, the rear section 807 at location 850 and the middle chamber section at location 820. Similarly, stacks for Store_2 were originally loaded in the middle chamber section at location 830 for frozen pallets and at the rear section 807 for dry pallets.

In various embodiments, load plan 805 further illustrates a feasible load plan output by the load planner with original stacks that could not be fully physically loaded into this tri-temperature trailer. In this example, the feasible load plan can be created by the stack building/optimization blocks similar or identical to activities described above in FIG. 4. In this exemplary load plan Store_1 and Store_2 each have multiple stacks of pallets or combines that are designed to be loaded in different sections of the tri-temperature trailer. In many embodiments of this exemplary load plan, the original stacks could not be fully loaded per the optimized load plan for several reasons including, among other potential reasons, a) the total number of pallets and/or stacks included too many freezer stacks with temperatures of −20 degrees, where these frozen stacks are stored in the middle chamber section due to bulkhead and dimension rules, b) there were an odd number of freezer stacks that could benefit from an empty pallet to fill the empty floor position, c) a rear axle maximum weight limitation violation exists no matter the potential reconfigurations of potential floor spots for each stack of pallet could be rearranged, and d) as a consequence some pallets were left off from loading the feasible load plan becoming unplanned pallets without a load plan or route plan to deliver the pallets with the current route plan. In various embodiments, load plan 805 illustrates examples of unnecessary combines or stacks of pallets such as location 820 shows two combines of stacks that can be potentially unstacked at stack location 825, stack location 835, and pallet location 856. Further in this example, floor location 845 illustrates a floor location where an empty pallet in the middle chamber section can be placed to fill the empty position.

In this example, load plan 805 is based on an exemplary load plan and route plan as follows: Input: Store pallets and route sequence to from a distribution center (DC) →Store_1→Store_2→DC, using a tri-temperature trailer to complete this route plan. In several embodiments, the route plan for load plan 805 can include deliveries from a start point (DC) to a Store_1, a Store_2, then to return to the DC.

Figure 9:
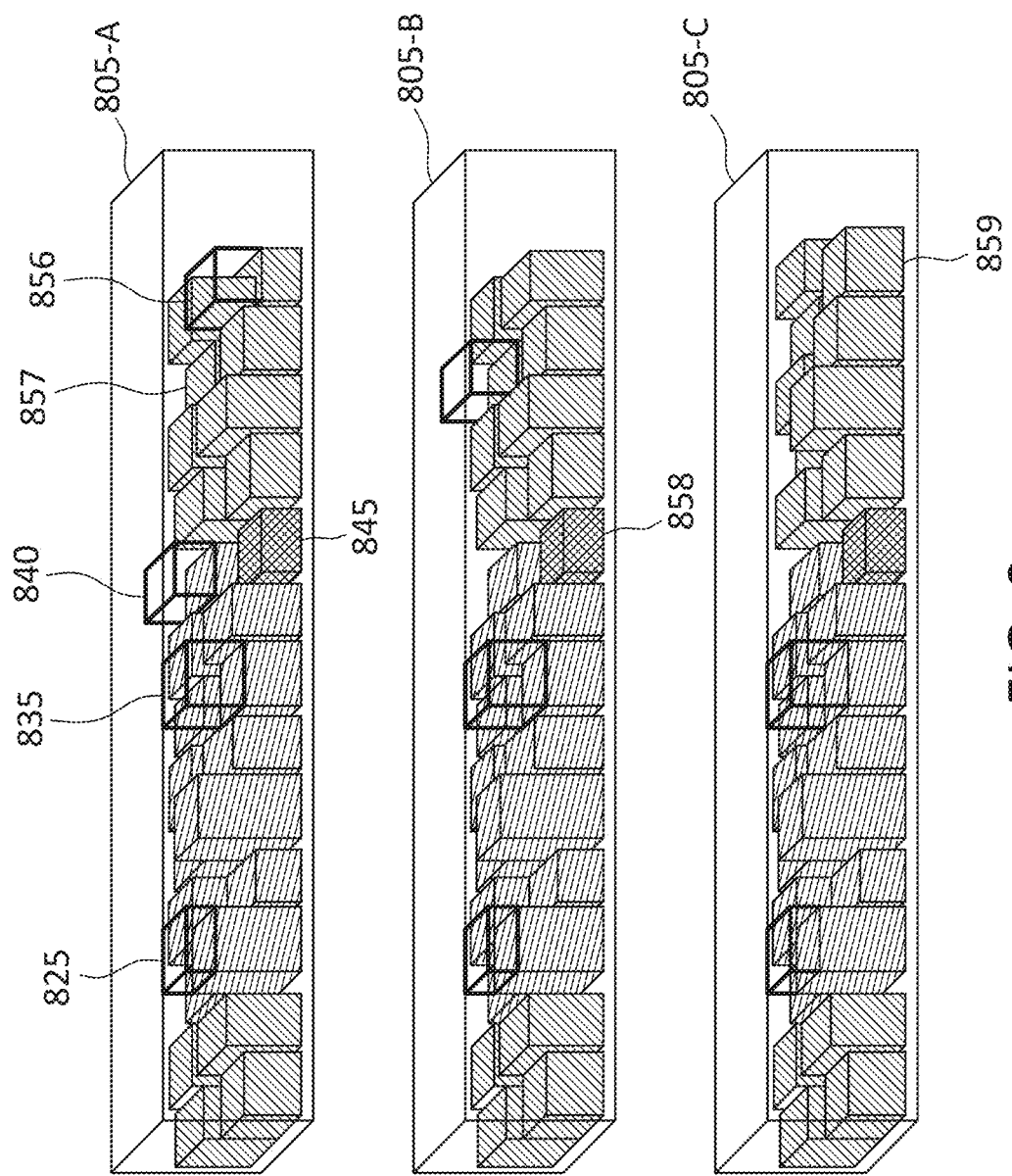
FIG. 9 illustrates illustrate three load plans, which show steps in applying a simulated annealing framework to the load plan of FIG. 8.

Moving ahead in the drawings, FIG. 9 illustrate three load plans 805-A, 805-B, and 805-C, which show steps in applying a simulated annealing framework to load plan 805 (FIG. 8). FIG. 9 shows how a simulated annealing framework can reconfigure an initial solution that has become unfeasible after loading a trailer to generating a new load plan with a current best solution over the initial solution. FIG. 9 can be a 928 of activities in connection with applying simulated annealing to load plan 805 (FIG. 8). In this example, the activities described in connection with load plan 805 (FIG. 8) can be demonstrated as iterations implemented by load plan 805-A, load plan 805-B, and load plan 805-C. In some embodiments, the iterations of implementing load plan 805 (FIG. 8) can illustrate (i) reconfigured stacks at each stage of generating better load plans that are feasible and (ii) moving pallets into empty floor spaces to singly and/or collectively resolve the load infeasibility issue. In many embodiments, a simulated annealing framework can be similar or identical to the activities described in connection with block 630 (FIG. 6).

In various embodiments, advantages of the simulated annealing framework includes (1) randomly swapping pallets to generate or create new stacks based on multiple local searches, (2) various feasibility checks can be run for each new reconfigured load plan for each iteration against loading rules and restrictions to avoid violations, and (3) after each iteration, updating a current best solution with a reconfigured load plan can resolve the current loading problems reducing empty floor spaces, or unplanned pallets, and/or another suitable loading problem.

In a number of embodiments, load plan 805-A illustrates how to run the simulated annealing framework when the initial load plan solution of the original stacks become load infeasible after loading pallets in a tri-temperature trailer. In several embodiments, the unstacking algorithm and the simulated annealing framework can be used in conjunction with another suitable trailer size including dry trailers and temperature controlled trailers. In following with this example, the simulated annealing framework can begin with an input of the initial load solution from the initial load plan that is no longer a feasible load plan after loading. After the simulated annealing framework conducted a minimum of 5 local searches, load plan 805-A can become load plan 805-B.

In following this example, load plan 805-B illustrates a reconfiguration of the initial load plan into a better solution where the stacks can become feasible after a pallet change from a parent pallet configuration in 805-A after running 5 iterations of local searches.

Specifically, load plan 805-B illustrates a new configuration by splitting a pallet or a portion of a stack or combine at pallet location 840 and relocating that pallet or portion to the empty floor space at floor location 845 now labeled as pallet location 858. In various embodiments, load plan 805-B illustrates these changes that generated a better solution than the original solution but not necessarily the best solution: (1) one pallet unstacked (no empty pallet needed, axle weight feasible, and (2) one pallet change at its parent pallet. After the simulated annealing framework conducted a minimum of 92 local searches while learning from the previous 5 iterations of local searches and from each output of a reconfigured load plan, load plan 805-B can proceed to load plan 805-C.

In further following with this example, load plan 805-C illustrates reaching an iteration limit of the simulated annealing framework and generating a better load plan that is load feasible (e.g., better solution) than the previous reconfigured solution output in block 805-B. Specifically, block 805-C illustrates another version of the previous re-configuration in block 805-B, where the stack at pallet location 856 (805-A) is split into a pallet of a stack of pallets or a portion of the stack of pallets and that portion of the stack of pallets can be moved to pallet location 857 (805-A) by adding the stack on top of the existing pallets at pallet location 857 and reducing the combine at pallet location 856 now labeled as new pallet location 859.

In a number of embodiments, block 805-C illustrates these changes that generated another better solution than the current better solution in 805-B that can be implemented as the final reconfigured load plan that resolved the initial load infeasibility problem better than the current better solution in 805-B: (1) after unstacking one pallet, the reconfigured load plan (e.g., better solution) included positioning of the stacks for a feasible load with less combines than the current solution in 805-B, and (2) the simulated annealing framework reached an iteration limit to return the best solution over the current solution of 805-B to generate the final reconfigured load plan.

Figure 10:
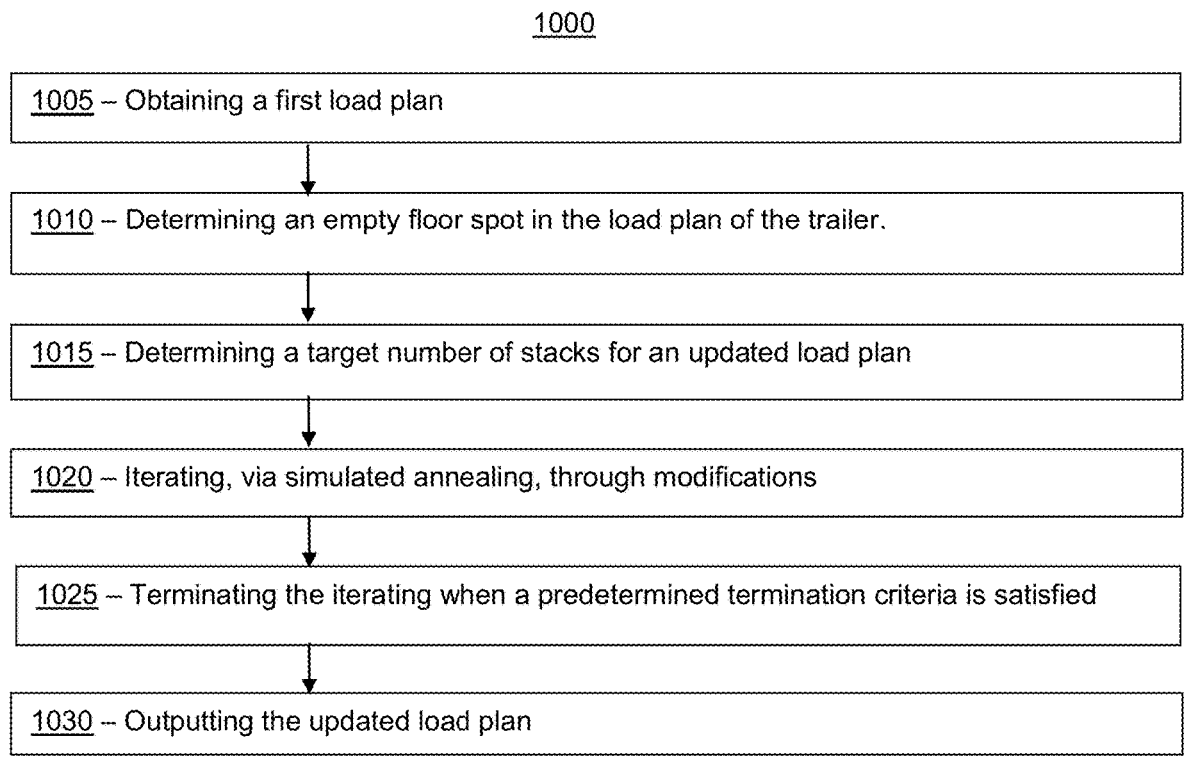
FIG. 10 illustrates a flow chart for a method of automatically determining how to modify a load plan by unstacking one or more pallets in one or more stacks while remaining in compliance with loading rules, according to another embodiment.

Turning ahead in the drawings, FIG. 10 illustrates a flow chart for a method 1000 of automatically determining how to modify a load plan by unstacking one or more pallets in one or more stacks while remaining in compliance with loading rules, according to another embodiment. Method 1000 is merely exemplary and is not limited to the embodiments presented herein. Method 1000 can be employed in many different embodiments and/or examples not specifically depicted or described herein. In some embodiments, the procedures, the processes, and/or the activities of method 1000 can be performed in the order presented. In other embodiments, the procedures, the processes, and/or the activities of method 1000 can be performed in any suitable order. In still other embodiments, one or more of the procedures, the processes, and/or the activities of method 1000 can be combined or skipped. In several embodiments, system 300 (FIG. 3) can be suitable to perform method 400 and/or one or more of the activities of method 1000.

In these or other embodiments, one or more of the activities of method 1000 can be implemented as one or more computing instructions configured to run at one or more processors and configured to be stored at one or more non-transitory computer-readable media. Such non-transitory computer-readable media can be part of a computer system such as unstacking optimization system 300. The processor(s) can be similar or identical to the processor(s) described above with respect to computer system 100 (FIG. 1).

Referring to the drawings, method 1000 can include a block 1005 of obtaining a first load plan. In some embodiments, the first load plan can include a set of stacks assigned to floor spots of a trailer. In several embodiments, block 1005 can be implemented as described above in connection with FIG. 4.

In several embodiments, method 1000 also can include a block 1010 of determining that at least one of (a) there is an empty floor spot in the first load plan for the trailer or (b) the first load plan is infeasible. In several embodiments, block 1005 can be implemented as described above in connection with FIG. 5.

In many embodiments, method 1000 further can include a block 1015 of determining a target number of stacks for an updated load plan. In several embodiments, block 1015 can be implemented as described above in connection with block 620 (FIG. 6), FIG. 7, and FIG. 9.

In some embodiments, block 1015 of determining the target number of stacks also can include determining whether a quantity of pallets in the set of stacks is greater than or equal to a maximum number of floor spots of the trailer.

In various embodiments, block 1015 additionally can include determining whether a quantity of pallets in the set of stacks is greater than or equal to a maximum number of floor spots of the trailer. In several embodiments, when the first load plan is feasible, block 1015 further can include setting the target number of stacks equal to the quantity of pallets. In many embodiments, block 1015 of determining the target number of stacks additionally can include, when the first load plan is not feasible, setting the target number of stacks equal to one fewer than the quantity of pallets.

In some embodiments, block 1015 of determining the target number of stacks further can include reducing the target number of stacks, when the first load plan is not feasible, when the set of stacks comprises dry pallets, when the target number of stacks is an odd number, and/or when adding an empty pallet will exceed a weight limit of the trailer.

In various embodiments, for each respective temperature compartment of the trailer, when the quantity of pallets is greater than or equal to the maximum number of floor spots of the trailer and the set of stacks comprises temperature-controlled pallets with perishable goods, block 1015 of determining the target number of stacks additionally can include reducing a respective quantity of a respective subset of the set of stacks by one when a respective subset of the set of stacks for each respective temperature compartment are not combinable and are an odd number.

In several embodiments, for each respective temperature compartment of the trailer, when the quantity of pallets is greater than or equal to the maximum number of floor spots of the trailer and the set of stacks comprises temperature-controlled pallets with perishable goods, block 1015 of determining the target number of stacks additionally can include setting the target number of stacks equal to a sum of the respective quantities of the respective subsets of the set of stacks.

In some embodiments, block 1015 of determining the target number of stacks further also can include, when the quantity of pallets is greater or equal to the maximum number of floor spots of the trailer and the set of stacks do not comprise temperature-controlled pallets with perishable goods, setting the target number of stacks equal to the maximum number of floor spots.

In a number of embodiments, method 1000 can include a block 1020 of iterating, via simulated annealing, through modifications to the updated load plan. In several embodiments, block 1020 also can include receiving, as input, the target number of stacks for the first load plan. Block 1020 additionally can include initializing a solution for the updated load plan based on the first load plan. Block 1020 further can include until one or more predetermined termination criteria are satisfied, iteratively performing the following: performing a local search to determine a potential new solution to the updated load plan and when the potential new solution satisfies one or more predetermined improved-solution criteria, updating the solution to be the potential new solution. Block 1020 additionally can include outputting the solution as the updated load plan. In several embodiments, block 1020 can be implemented as described above in connection with block 520 and 540 (FIG. 5), block 630 of FIG. 6, and FIG. 9.

In various embodiments, the one or more predetermined improved-solution criteria can include that the solution is not feasible and the potential new solution is feasible. In some embodiments, the one or more predetermined improved-solution criteria also can include that the solution is feasible and a number of stacks in the potential new solution is more than a number of stacks in the solution.

In several embodiments, method 1000 also can include a block 1025 of terminating the iterating when a predetermined termination criteria is satisfied. The one or more predetermined termination criteria can include: when a quantity of stacks in the solution is equal to the target number of stacks. The one or more predetermined termination criteria also can include the solution is feasible. The one or more predetermined termination criteria further can include exceeding a predetermined time limit. The one or more predetermined termination criteria additionally can include exceeding a predetermined iteration limit. In several embodiments, block 1025 can be implemented as described above in connection with block 640 (FIG. 6), block 725 (FIG. 7) and FIG. 9.

In some embodiments, method 1000 additionally can include a block 1030 of outputting the updated load plan. In several embodiments, block 1030 can be implemented as described above in connection with blocks 415, 430, 435 (FIG. 4), blocks 646, 650, and 655 (FIG. 6), FIG. 7, and FIG. 9.

Returning to FIG. 3, in many embodiments, communication system 301 can at least partially perform block 405 (FIG. 4) receiving input parameters for that can be used in generating a load plan.

In many embodiments, stacking system 302 can at least partially perform block 410 (FIG. 4) of utilizing a load planner optimizer core engine to generate a load plan and a route plan, block 415 (FIG. 4) of building stacks can be employed to build stacks of pallets based on a number of orders for delivery to another location or destination, block 620 (FIG. 6) of identifying a target number of the combination stacks and/or pallet stacks, block 735 (FIG. 7) of determining if a dry commodity of a target number of stacks (e.g., combines) is an odd number of stacks, block 750 (FIG. 7) of determining whether or not a stack or combine is carrying or transporting perishable items or goods, and/or block 755 (FIG. 7) of determining whether or not for each stack or stack of pallets that is temperature dependent includes a combine.

In many embodiments, modification system 303 can at least partially perform block 505 (FIG. 5) of inputting a load plan with original pallets stacked, blocks 510 (FIG. 5) of determining when to conduct or implement an unstacking optimization process, block 540 (FIG. 5) of determining when to conduct or implement a second iteration of an unstacking optimization process, block 515 (FIG. 5) of determining whether or not the load problem includes empty floor spots on the trailer floor after implementing the load plan and/or the load of the load plan is infeasible, block 530 (FIG. 5) of determining whether or not to conduct a distribution of the pallets on the trailer floor, block 535 (FIG. 5) of distributing pallets until a load becomes feasible, block 540 (FIG. 5) of determining when to conduct or implement a second iteration of an unstacking optimization process, block 560 (FIG. 5) of removing a heaviest component in the load until the load is feasible, block 565 (FIG. 5) of identifying optimal floor spot positions for placement of the pallets or stacks, block 615 (FIG. 6) of determining whether or not a load is feasible without combination stacks or combines, block 630 of how implementing a simulated annealing algorithm can update a reconfigured set of data into a current or best load solution (FIG. 6), block 635 (FIG. 6) of preparing an initial solution based on the number of stacks or combines identified to modify or reconfigure an infeasible load into a feasible load, block 645 (FIG. 6) of generating a new iteration of a local search based on the reconfigured data received from block 635, block 646 (FIG. 6) of determining whether a better load solution is found from the previous load solution, block 650 (FIG. 6) of updating a reconfigured load plan with a current and/or best solution that previous iterations, block 725 (FIG. 7) of returning updates or reconfigured stacks with no combines, block 730 (FIG. 7) of reducing a target number of stacks by 1 pallet and/or stack to reconfigured the updated placement of the stacks and combines for each load, and/or block 760 (FIG. 7) of reducing a target number of stacks by 1 stack or pallet.

In many embodiments, routing engine 304 can at least partially perform block 420 (FIG. 4) of constructing a route plan based on orders for delivery to another location, and/or block 440 (FIG. 4) of generating a route plan based on the reconfigured route plan output from block 429.

In many embodiments, loading system 305 can at least partially perform block 430 (FIG. 4) of optimizing a load after incorporating the reconfigured route plan with improvements of block 429, block 435 of generating an original load plan and/or a reconfigured load plan as output by the activities of block 410, block 505 (FIG. 5) of inputting a load plan with original pallets stacked, block 520 (FIG. 5) of implementing an unstacking optimization algorithm to output a reconfigured set of data for use in block 530, block 520 (FIG. 6) can include implementing an unstacking optimization framework using simulated annealing algorithms where original stacks built for each store is used as input block, 545 (FIG. 5) of determining whether or not the load problem includes empty floor spots on the trailer floor, block 550 (FIG. 5) of implementing an unstacking optimization algorithm based on another reconfigured set of data from block 545, block 655 (FIG. 6) of updating the previous load stack plan with a reconfigured load stack plan resolving the load problem, block 710 (FIG. 7) of initiating a target number of stacks and/or combines as input into block 715, block 715 (FIG. 7) of determining whether the number of pallets and/or stacks (e.g. combines) are greater than the maximum number of Floor Spots in a trailer, block 770 (FIG. 7) of outputting reconfigured number of target stacks based on the maximum floor spots in a trailer based on dry commodity pallets, and/or block 775 (FIG. 7) of outputting reconfigured number of target stacks based on the maximum floor spots in a trailer based on perishable commodity pallets.

In many embodiments, rules system 306 can at least partially perform block 405 (FIG. 4) of receiving input parameters also can be used to generate a route plan to deliver pallets of goods or items of orders to predetermined destinations in a predetermined order, block 620 (FIG. 6) of identifying a target number of the combination stacks and/or pallet stacks, and/or block 740 (FIG. 7) of determining whether or not adding an empty pallet to the trailer floor exceeds a weight restriction of the load where the load becomes overweight thus infeasible.

In many embodiments, terminating system 307 can at least partially perform block 640 (FIG. 6) of determining when to terminate the simulated annealing algorithm.

In many embodiments, feasibility system 308 can at least partially perform block 425 (FIG. 4) of implementing multiple feasibility checks on a current route design constructed in block 420, block 429 (FIG. 4) of generating an improvement to a route plan or a route using the output of the feasibility checks in block 425, block 555 (FIG. 5) of determining whether the load is feasible, block 720 (FIG. 7) of determining whether or not a pallet as stacked or arranged in the trailer floor is load feasible, and/or block 745 (FIG. 7) of reducing a number of target stacks or combines by one stack or pallet to maintain a load that is feasible.

In many embodiments, the techniques described herein can be used continuously at a scale that cannot be handled using manual techniques. For example, the number of daily and/or monthly load plans and route plans can exceed approximately ten thousand and/or other suitable numbers and/or the number of products and/or items sold on the website can exceed approximately ten million (10,000,000) approximately each day.

Various embodiments can include a system including one or more processors and one or more non-transitory computer-readable media storing computing instructions, that when executed on the one or more processors, cause the one or more processors, to perform certain acts. The acts can include obtaining a first load plan. The first load plan can include a set of stacks assigned to floor spots of a trailer. The acts also can include determining that at least one of (a) there is an empty floor spot in the first load plan for the trailer or (b) the first load plan is infeasible. The acts further can include determining a target number of stacks for an updated load plan. The acts additionally can include iterating, via simulated annealing, through modifications to the updated load plan. The acts further can include terminating the iterating when a predetermined termination criteria is satisfied. The acts also can include outputting the updated load plan.

A number of embodiments can include a method being implemented via execution of computing instructions configured to run on one or more processors and stored at one or more non-transitory computer-readable media. The method can include obtaining a first load plan. The first load plan can include a set of stacks assigned to floor spots of a trailer. The method also can include determining that at least one of (a) there is an empty floor spot in the first load plan for the trailer or (b) the first load plan is infeasible. The method further can include determining a target number of stacks for an updated load plan. The method additionally can include iterating, via simulated annealing, through modifications to the updated load plan. The method further can include terminating the iterating when a predetermined termination criteria is satisfied. The method also can include outputting the updated load plan.

Although automatically running an unstacking optimization platform has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-10 may be modified, and that the foregoing discussion of certain of these embodiments does not necessarily represent a complete description of all possible embodiments. For example, one or more of the procedures, processes, or activities of FIGS. 3-7 and 10 may include different procedures, processes, and/or activities and be performed by many different modules, in many different orders, and/or one or more of the procedures, processes, or activities of FIGS. 3-7 and 10 may include one or more of the procedures, processes, or activities of another different one of FIGS. 3-7 and 10. Additional details regarding communication system 301, stacking system 302, modification system 303, routing engine 304, loading system 305, rules system 306, terminating system 307 and/or feasibility system 308 (see FIGS. 3 and 10) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system for reducing rolled over routes, the system comprising:
   one or more processors; and
   one or more non-transitory computer-readable media storing computing instructions, that when executed on the one or more processors, cause the one or more processors, to perform:
      obtaining, using a stacking system of the system, a first load plan, wherein the first load plan comprises a set of stacks assigned to floor spots of a trailer;
      determining, using a modification system of the system, that at least one of (a) there is an empty floor spot in the first load plan for the trailer or (b) the first load plan is infeasible;
      determining, based on a quantity of pallets in the set of stacks and based on reducing a quantity of combines, a target number of stacks for an updated load plan;
      iterating, using a loading system of the system, via simulated annealing, and based on the target number of stacks, through modifications to determine a potential new solution to the updated load plan;
      determining that one or more criteria are satisfied based on determining the potential new solution to the updated load plan;
      terminating, using a terminating system of the system, the iterating based on determining that the one or more criteria are satisfied; and
      outputting the updated load plan to cause the target number of stacks to be loaded in the trailer according to the potential new solution to the updated load plan.

2. The system of claim 1, wherein determining the target number of stacks comprises:
   determining whether the quantity of pallets in the set of stacks is greater than or equal to a maximum number of floor spots of the trailer;
   when the quantity of pallets is less than the maximum number of floor spots of the trailer, determining whether the first load plan is feasible; and
   when the first load plan is feasible, setting the target number of stacks equal to the quantity of pallets.

3. The system of claim 2, wherein determining the target number of stacks further comprises:
   when the first load plan is not feasible:
      setting the target number of stacks equal to one fewer than the quantity of pallets; and
      when the set of stacks comprises dry pallets, the target number of stacks is an odd number and adding an empty pallet will exceed a weight limit of the trailer, reducing the target number of stacks by one.

4. The system of claim 2, wherein determining the target number of stacks further comprises:
   when the quantity of pallets is greater than or equal to the maximum number of floor spots of the trailer and the set of stacks comprises temperature-controlled pallets with perishable goods:
      for each respective temperature compartment of the trailer:
         reducing a respective quantity of a respective subset of the set of stacks by one when a respective subset of the set of stacks for each respective temperature compartment are not combinable and are an odd number; and
         setting the target number of stacks equal to a sum of the respective quantities of the respective subsets of the set of stacks.

5. The system of claim 2, wherein determining the target number of stacks further comprises:

when the quantity of pallets is greater or equal to the maximum number of floor spots of the trailer and the set of stacks do not comprise temperature-controlled pallets with perishable goods, setting the target number of stacks equal to the maximum number of floor spots.

6. The system of claim 1, wherein iterating through the modifications comprises:
receiving, as input, the target number of stacks for the first load plan;
initializing a solution for the updated load plan based on the first load plan;
until one or more predetermined termination criteria are satisfied, iteratively performing:
performing a local search to determine the potential new solution to the updated load plan.

7. The system of claim 6, wherein the one or more criteria are satisfied when:
the solution is not feasible, and the potential new solution is feasible; or
the solution is feasible, and a number of stacks in the potential new solution is more than a number of stacks in the solution.

8. The system of claim 6, wherein the one or more criteria are satisfied when:
a quantity of stacks in the solution is equal to the target number of stacks; and
the solution is feasible.

9. The system of claim 1, wherein the one or more criteria are satisfied when:
a predetermined time limit is exceeded.

10. The system of claim 1, wherein the one or more criteria are satisfied when:
a predetermined time limit is exceeded.

11. A method for reducing rolled over routes by iterating for loading a trailer, the method comprising:
obtaining a first load plan, wherein the first load plan comprises a set of stacks assigned to floor spots of the trailer;
determining that at least one of (a) there is an empty floor spot in the first load plan for the trailer or (b) the first load plan is infeasible;
determining a target number of stacks for an updated load plan;
iterating, using a loading system implemented on a computing system, via simulated annealing, and based on the target number of stacks, through modifications to determine a potential new solution to the updated load plan; and
outputting the updated load plan to cause the target number of stacks to be loaded in the trailer according to the potential new solution to the updated load plan.

12. The method of claim 11,
wherein determining the target number of stacks comprises:
determining whether a quantity of pallets in the set of stacks is greater than or equal to a maximum number of floor spots of the trailer;
when the quantity of pallets is less than the maximum number of floor spots of the trailer, determining whether the first load plan is feasible; and
when the first load plan is feasible, setting the target number of stacks equal to the quantity of pallets.

13. The method of claim 12, wherein determining the target number of stacks further comprises:
when the first load plan is not feasible:
setting the target number of stacks equal to one fewer than the quantity of pallets; and
when the set of stacks comprises dry pallets, the target number of stacks is an odd number and adding an empty pallet will exceed a weight limit of the trailer, reducing the target number of stacks by one.

14. The method of claim 12, wherein determining the target number of stacks further comprises:
when the quantity of pallets is greater than or equal to the maximum number of floor spots of the trailer and the set of stacks comprises temperature-controlled pallets with perishable goods:
for each respective temperature compartment of the trailer:
reducing a respective quantity of a respective subset of the set of stacks by one when a respective subset of the set of stacks for each respective temperature compartment are not combinable and are an odd number; and
setting the target number of stacks equal to a sum of the respective quantities of the respective subsets of the set of stacks.

15. The method of claim 12, wherein determining the target number of stacks further comprises:
when the quantity of pallets is greater or equal to the maximum number of floor spots of the trailer and the set of stacks do not comprise temperature-controlled pallets with perishable goods, setting the target number of stacks equal to the maximum number of floor spots.

16. The method of claim 11, wherein iterating, via simulated annealing, through the modifications to the updated load plan comprises:
receiving, as input, the target number of stacks for the first load plan;
initializing a solution for the updated load plan based on the first load plan;
until one or more predetermined termination criteria are satisfied, iteratively performing:
performing a local search to determine the potential new solution to the updated load plan; and
when the potential new solution satisfies one or more predetermined improved-solution criteria, updating the solution to be the potential new solution.

17. The method of claim 16, wherein the one or more predetermined improved-solution criteria comprise:
the solution is not feasible, and the potential new solution is feasible; or
the solution is feasible, and a number of stacks in the potential new solution is more than a number of stacks in the solution.

18. The method of claim 16, further comprising:
terminating the iterating when one or more predetermined termination criteria are satisfied,
wherein the one or more predetermined termination criteria comprise:
a quantity of stacks in the solution is equal to the target number of stacks; and
the solution is feasible.

19. The method of claim 16, further comprising:
terminating the iterating when one or more predetermined termination criteria are satisfied,
wherein the one or more predetermined termination criteria comprises:
exceeding a predetermined time limit.

20. The method of claim 16, further comprising:
terminating the iterating when one or more predetermined termination criteria are satisfied,
wherein the one or more predetermined termination criteria comprises:
exceeding a predetermined iteration limit.

\* \* \* \* \*